June 16, 1936.    F. S. WHEELER    2,044,140
RANGE CONTROL SYSTEM
Filed March 30, 1934
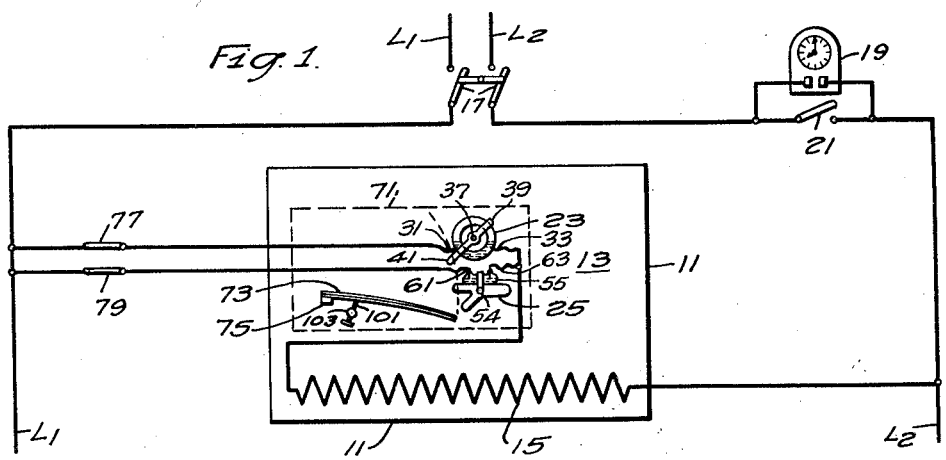
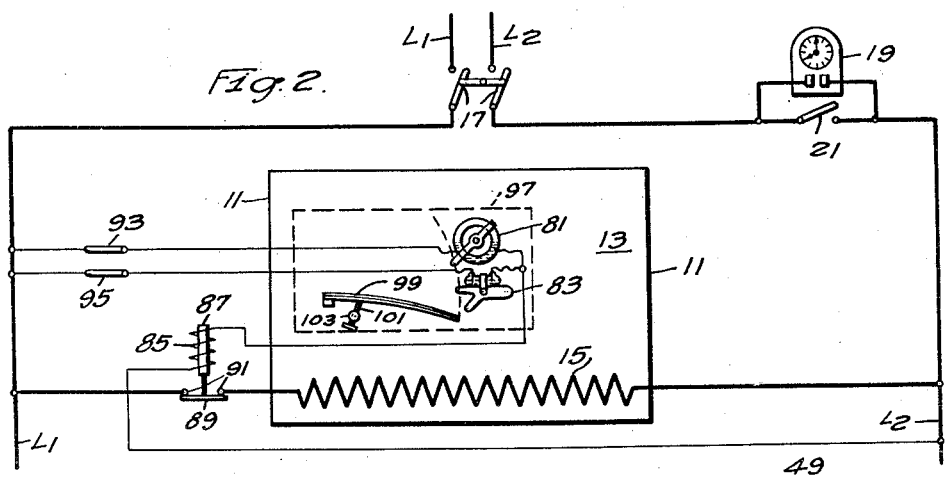
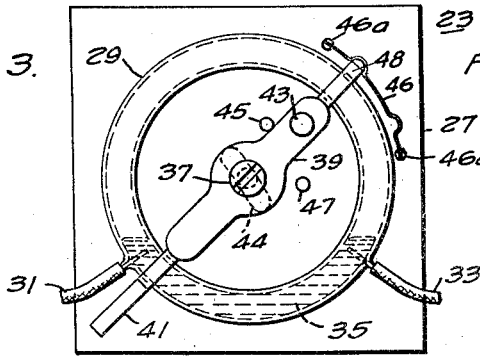
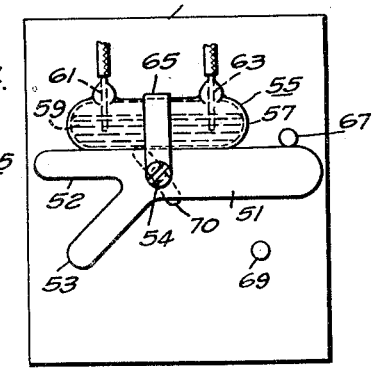
WITNESSES:
INVENTOR
Floyd S. Wheeler.
BY
W. R. Coley
ATTORNEY Patented June 16, 1936

2,044,140

UNITED STATES PATENT OFFICE 2,044,140

RANGE CONTROL SYSTEM

Floyd S. Wheeler, Alexandria, Va., assignor to Westinghouse Electric & Manufacturing Company, East Pittsburgh, Pa., a corporation of Pennsylvania Application March 30, 1934, Serial No. 718,273

8 Claims. (Cl. 219—20)

My invention relates to electric cooking appliances and particularly to temperature-control systems for electric ranges.

An object of my invention is to provide a relatively simple, inexpensive and easily installed and operated temperature-control system for an electric cooking appliance.

Another object of my invention is to provide a purely electric control system, particularly applicable to electric ranges, that shall permit of obtaining any one of a number of different temperature cycles in an electric cooking appliance.

Other objects of my invention will either be apparent from the following description of two embodiments of my invention or will be set forth in detail hereinafter.

In cooking certain types of foods such as roasts of meat, it is desirable that the meat be initially subjected to a temperature sufficiently high to sear the outer surface of the meat to seal the juices therein and to thereafter subject the meat to a lower maintained temperature to cook it to the desired degree. Heretofore in some of the prior-art types of ranges, particularly the gas heated ranges, the operator was obliged to manually adjust the amount of fuel burned to obtain the peak of searing temperature and then reduce the temperature by proper manipulation of the control valve to provide a substantially constant lower value of temperature in a cooking chamber.

My invention is especially applicable to electrically heated ranges and provides a control system therefor embodying a minimum number of parts, more particularly thermally-actuable circuit controllers which individually control the energization of the heating element either directly or indirectly, the circuit controllers being actuated in predetermined sequence by a single thermally actuable element, which may be a bimetal member. The two circuit controllers may be rendered effective or ineffective, at the will of an operator, in order that different temperature cycles may be obtained.

In the accompanying single sheet of drawing,

Figure 1 is a diagram of connections showing one form of appliance and system embodying my invention, Fig. 2 is a view similar to Fig. 1 but showing a modification of the system shown therein, Fig. 3 is a view in front elevation of one form of circuit controller which I may use, and Fig. 4 is a view in front elevation of another form of circuit controller usable in the system and appliance embodying my invention.

My invention is closely related to copending applications Serial Nos. 718,272, 718,273, 718,274, 718,275, 718,276, and 718,277, filed concurrently herewith by H. M. Biebel and assigned to Westinghouse Electric and Manufacturing Company.

Referring first to Fig. 1 of the drawing, I have there illustrated a cooking appliance comprising a plurality of walls 11 enclosing a cooking chamber 13 and having either located therein or operatively associated therewith a heating element 15 which is of sufficient heating capacity to raise the temperature of the cooking chamber and of any food which may be placed therein to the desired value to effect desired cooking operations thereon.

A supply circuit for the heating element 15 includes two supply circuit conductors $L_1$ and $L_2$ and a manually operable switch 17 which may be located on the cooking appliance itself.

As it may at times be desirable or necessary to utilize a time control for starting and stopping the cooking operation, I may provide a time-controlled switch 19, shown schematically only, and in order to render this time-controlled switch effective or ineffective, I provide a manually-actuable switch 21 connected in parallel-circuit therewith.

One end of the heating element 15 is connected by a suitable conductor to a continuation of conductor $L_2$ while the other end thereof is connected to two switches or circuit controllers 23 and 25 respectively. These two circuit controllers may be of any one of a number of different types of switches possessing certain characteristics necessary for the proper operation of my system, which characteristics will be hereinafter set forth in detail.

Referring now to Fig. 3 of the drawing, I have there illustrated one form of circuit controller 23 having two opposed limiting positions and comprising a plate 27, preferably of electric-insulating material although not necessarily so, and on which there is pivotally mounted a toroidal form of mercury switch 29 which includes, in a manner well known in the art, a closed annular casing of glass or quartz having two flexible leads 31 and 33 sealed into one wall thereof and a quantity of mercury 35, so that in one position of the switch the mercury will engage the ends of the flexible leads 31 and 33 to complete an electric circuit therethrough. The torus 29 is pivotally mounted on a stud or bolt 37 secured to the base 27, and a diametrically-extending clamping member 39 supports the torus 29 on the pivot pin 37. At one end of the clamp 39 there is an extension 41 projecting beyond the torus to be engaged by a movable actuating member to be hereinafter described. The clamping member 39 is provided also with a projecting pin or lug 43 to permit of manually actuating the switch 23 to either one of its two limiting positions. These limiting positions are defined by a pair of spaced stop pins 45 and 47 supported by plate 27, and a light flat-spring 46, having two dents or depressions therein, is engaged by a projection 48 on the clamping member 39 to positively hold the switch in either one of its two limiting positions where the clamping support 39 is in engagement with either pin 45 or pin 47, until moved therefrom by some suitable actuation thereof. The spring 46 may be held in its proper operative position as by end pins 46a. When the controller 23 is in the position shown in Fig. 3 of the drawing, the circuit therethrough is closed, while if it is turned in a clockwise direction until clamp 39 engages stop pin 47, the circuit therethrough is interrupted. A slot 44 is provided in plate 27 to permit of adjusting the position of the switch, to cause operation thereof at different temperatures. Other equivalent means to permit of adjustment may, however, be provided.

Referring now to Fig. 4 of the drawing, I have there shown a somewhat different form of circuit breaker 25 which is also pivotally mounted on a suitable support here shown as a plate 49. An arm 51, of substantially Y-shape, and having two leg portions 52 and 53 is pivotally mounted on the plate 49 as by a pivot pin or stud 54. A mercury switch 55 which may be in the form of a short glass or quartz tube 57 is partially filled with mercury 59 and has the ends of two flexible leads 61 and 63 sealed into the tube and in engagement with the mercury in one position of the switch. A clamp 65 holds the tube 57 on the arm 51 and I prefer to so locate the switch or circuit controller 55 on the arm 51 that the switch will remain in either one of two limiting positions, the first being that when the arm 51 engages an upper stop pin 67, when the circuit through the switch is closed, and the second being that position when the arm 51 engages a lower stop pin 69 and the circuit through the switch is open. A slot 70 is provided to enable an operator to vary the position or location of the switch and therefore of its operating temperature.

Referring now again to Fig. 1 of the drawing, the two switches or circuit controllers 23 and 25, of Fig. 3 and Fig. 4, respectively, are shown as mounted on a single plate 71 instead of on separate base plates, although this construction is not essential.

Actuation of the two circuit controllers is effected by a suitable thermally actuable element, here shown as a bimetal strip 73 having one end thereof fixedly mounted as by being secured against a lug 75 secured to plate 71, the other end of element 73 being free to move in response to variations of cooking chamber temperature.

As has already been stated, one of each of the two flexible leads of the respective circuit controllers 23 and 25 are connected together and to one end of the heating element 15 and it may be noted that leads 33 and 63 are so connected. The other lead 31 of controller 23 is connected to one end of a manually actuable switch 77, the other terminal of which is connected to the continuation of supply circuit conductor L₁. The other flexible lead 61 of controller 25 is connected to one terminal of a manually operable switch 79, the other terminal of which is also connected to the continuation of supply circuit conductor L₁.

Referring now to Fig. 2 of the drawing, I have there illustrated a modified form of system embodying my invention including, however, the hereinbefore described supply circuit conductors L₁ and L₂, the main manually operable switch 17, the time-controlled switch 19 and the manually operable switch 21 shunting the time controlled contacts.

The cooking chamber 13 is defined by a plurality of walls 11 and a heating element 15 is located therein. Substantially the same types of circuit controllers as were hereinbefore described in connection with Fig. 1 of the drawing are shown, but the current-carrying capacity of the respective circuit controllers 81 and 83 can be much less for the reason that they control only the circuit of the actuating coil 85 of a contactor, including in addition to the coil 85 the usual movable armature core 87 and a contact bridging member 89 movable therewith and engaging fixed contact members 91 connected in circuit with heating element 15 to control the energization thereof.

While the circuit controllers 23 and 25 of Fig. 1 had a current carrying capacity sufficiently large to properly carry and interrupt the current traversing the heating element 15, which current may be on the order of 20 to 30 amperes, circuit controllers 81 and 83 will be called upon to interrupt a circuit traversed by less than one ampere. A manually-operable switch 93 is connected in series circuit with controller 81 and a similar manually-operable switch 95 is connected in series circuit with controller 83. The two circuit controllers 81 and 83 may be suitably mounted on a plate 97 which is also available for supporting a thermally actuable element 99 of the same kind as was hereinbefore described in connection with the system of Fig. 1.

Simultaneous adjustment of the operating temperatures of the two circuit controllers in one or the other direction may be effected in any desired manner and one means shown in both Fig. 1 and Fig. 2 is the provision of an adjusting screw 101 mounted in a stud or pin 103, the screw 101 having a knurled head thereon to adjust the position of the bimetal strip 73 or 99. Other equivalent means for individually adjusting the circuit controllers may also be provided in a manner well known in the art.

Let it be assumed that it is desired to subject a roast of meat to a momentary peak temperature of sufficient value to properly sear the same and to thereafter subject it to a lower maintained and substantially constant value until the roast shall have been cooked to the desired degree. To this end, the operator closes the manually operable switches 77 and 79 (or 93 and 95) and then closes the main switch 17 and, if no time control is desired, also switch 21. This effects energization of the heating element 15, through circuits including the parallel-connected controllers 23 and 25, for example, which will cause an increase in the temperature of the cooking chamber and a corresponding movement of the free end of the bimetal strip 73 (or 99), and for illustrative purposes it is to be assumed that the free ends of these strips will move in a counter clockwise direction.

The design and adjustment of circuit controllers 25 (and 83) relatively to the thermally actuable member is such that the movable end of member 73 (or 99) will engage the upper arm 52 at a certain temperature, which will be substantially the desired maintained temperature.

The result of this operative engagement of the thermal element and fork arm 52 is that controller 25, for example, is turned in a clockwise direction and against stop pin 69, thereby interrupting the circuit through the controller, as previously explained. This will have no effect, however, upon the energization of heating element 15, since the energization thereof is continued through circuit controller 23, for example, which is connected in electric parallel-circuit with controller 25.

At a certain higher temperature, the movable end of the bimetal strip engages the projection or extension 41 of controller 23, for example, and moves the controller or switch to its open position. This has the result of deenergizing heating element 15 and it is to be understood that the cooperation of thermal element 73 or 99) with circuit breaker 23 (or 81) is such as to interrupt the circuit at a predetermined peak or relatively high temperature which for purposes of illustration may be assumed to be in the order of 500° to 550° F. The maximum temperature in the cooking chamber will, of course, be substantially momentary only and will decrease shortly after the interruption of the circuit through the heating element 15. At a certain lower temperature, the movable end of bimetal element 73 (or 99) will engage fork arm 53 of controller 25, for example, and cause the controller to turn in a counter clockwise direction to reclose the circuit therethrough which will reenergize heating element 15. For purposes of illustration, this lower temperature value may be considered as being on the order of 300° or 400° F. and will be such a temperature as will properly cook either a roast or any other kind of food which may have been placed in the cooking chamber 13.

The clockwise movement of the free end of bimetal strip 73 resulting from a decreasing temperature in the cooking chamber 13 will, therefore, be stopped a certain time after the reenergization of heating element 15, because of the translation of electric energy into heat therein with consequent reheating of the cooking chamber and of any food placed therein. The bimetal strip will, therefore, again move in a counter clockwise direction, will shortly reengage fork arm 52 and again effect opening of the circuit through controller 25 and since controller 23, for example, remains in its open position since bimetal strip 73 does not again engage it and, in fact, is not adapted to move controller 23 in a counter-clockwise direction, control of the energization of heating element 15 is now effected solely by controller 25, for example. The thermal element will, therefore, cooperate with controller 25 to intermittently sequentially energize and deenergize the heating element 15 to thereby maintain a substantially constant average value of temperature in the cooking chamber 13. As has already been stated, the heating element 15 may be finally deenergized either by the time-controlled switch 19 or by manual operation of either of switches 17 or 21.

Let it be assumed that the operator desires to obtain a momentary peak temperature value with a gradual but continuous decrease in temperature of the cooking chamber. To this end, manual switch 79 of Fig. 1 is moved to open position and switch 77 is moved to closed position or is left in such position. Heating element 15 will then be energized through controller 23 and switch 77, and bimetal strip 73 will move counter-clockwise in the manner hereinbefore described, moving controller 25 to open position which, however, will have no effect upon the heating element 15, since switch 79 is already open. However, when the moving end of strip 73 engages extension 41 on switch 23, it will actuate it to open position, thereby deenergizing heating element 15, and since thereafter the bimetal strip moves in a clockwise direction in accordance with the gradually decreasing temperature of the cooking chamber, no further reenergization of the heating element 15 will be effected (switch 79 remaining open) and the cooking operation of the food placed in the cooking chamber is completed by stored heat.

Let it be assumed that the operator desires to provide a substantially constant maintained lower temperature value in the cooking chamber, he will then open switch 77 and either close switch 79 or leave it in its closed position. In this case, the movable end of bimetal strip 73 will operate in the manner hereinbefore set forth and will engage fork arm 52 at substantially the maintained temperature value to open the circuit through the heating element 15. The temperature in the cooking chamber will thereafter drop (since the circuit through controller 23 is open at switch 77), the bimetal strip will move in a clockwise direction and at a certain lower temperature it will engage fork arm 53 to reclose the circuit breaker and reenergize heating element 15. This intermittent sequential energization and deenergization will be continued for as long as the circuit or system is energized and may be discontinued, when desired, in the manner hereinbefore set forth either by the time clock 19 or one of the two switches 17 and 21.

The same two additional cycles of operations as to the temperatures in the cooking chamber 13 may be obtained by the system shown in Fig. 2 of the drawing, it being noted however that the circuit controllers do not directly control the energization of heating element 15 but indirectly only, through the contactor shown as constituting a part of the system. It will be apparent that whereas switches 77 and 79 and circuit controllers 23 and 25 must have current-carrying capacity comparable to that of heating element 15, this is not the case as regards switches 93 and 95 and circuit controllers 81 and 83. While the system shown in Fig. 2 adds a contactor, it at the same time reduces the current carrying capacity of the two series-connected circuit-controlling devices in each of the two parallel circuits.

While I have shown a particular form of thermally actuable element, I do not desire to be limited thereto as any suitable or desired form of such thermally actuable element may be used. I wish to point out that the bimetal element or its equivalent is not subjected to any initial stress but that it is free to move in direct accordance with the variations in the temperature of the cooking chamber. While I have shown and described particular embodiments of circuit controllers, I do not desire to be limited thereto, as other forms of circuit controllers effective for the same purpose may be utilized.

I wish to here point out the essential differences in the design and operation of the two different circuit controllers insofar as they apply to my invention. Circuit controllers 25 and 83 are plural-cycle switches or controllers directly operatively engaged and actuated by a thermal element; that is, they cooperate with the thermal element to intermittently sequentially energize and deenergize a circuit in which they are included. Circuit controllers 23 and 81 are, on the contrary, single-cycle switches or controllers; that is, they will be individually operatively actuated by the thermal element once only in any one cycle of operation, this actuation being from an initially closed-circuit position to an open-circuit position, the controller remaining in such open-circuit position thereafter until manually moved to its closed-circuit position.

The device and system embodying my invention thus provide a relatively simple, purely electrical temperature control means whereby an operator may obtain, at different times, any one of a number of different temperature cycles in a cooking chamber or other cooking appliance. The appliance and system is not limited in its application to electric cooking but may be utilized in other fields where such temperature cycles may be desirable and useful.

Various further modifications may be made in the device and system embodying my invention without departing from the spirit and scope thereof, and I desire, therefore, that only such limitations shall be placed thereon as are imposed by the prior art or are set forth in the appended claims.

I claim as my invention:

1. In an electric cooking appliance including a cooking chamber and a heating element therefor, means for controlling the energization of the heating element to obtain a momentary peak temperature and then a lower maintained temperature in the cooking chamber, said means including a pair of parallel-connected switches individually controlling the energization of the heating element and a single thermally-actuable element movable in response to variations in the chamber temperature operatively mechanically shifting the two switches in predetermined sequence to first open one of said switches at substantially the maintained temperature value and to then open the second switch at substantially the peak temperature value and thereafter to operatively mechanically shift the first switch to close and open the same to thereby intermittently sequentially energize and deenergize the heating element to maintain a substantially constant average temperature in the cooking chamber.

2. In an electric cooking appliance including a cooking chamber and a heating element therefor, means for controlling the energization of the heating element to obtain a momentary peak temperature and then a lower maintained temperature in the cooking chamber, said means including a pair of parallel-connected switches each connected in series circuit with the heating element to directly control the energization thereof, and a thermally-actuable element movable in response to variations in chamber temperature and mechanically engaging the two switches in sequence to move them to open position to effect deenergization of the heating element at the desired peak temperature and then to again move the first-moved switch to effect sequential intermittent energization and deenergization of the heating element to maintain a substantially constant average temperature in the cooking chamber.

3. In an electric cooking appliance including a cooking chamber and a heating element therefor, means for controlling the energization of the heating element to obtain any one of a plurality of temperature cycles in the cooking chamber, said means including a thermally-actuable member movable in response to variations in the chamber temperature, two switches severally controlling the energization of the heating element, electric conductors connecting the switches in parallel with each other and means for rendering the respective switches effective and ineffective, whereby when both switches are effective they will be mechanically actuated in the same direction by the thermally-actuable member in sequence to open position to deenergize the heating element at a predetermined peak temperature and thereafter to intermittently sequentially energize and deenergize the heating element to maintain a lower and substantially constant average value of temperature in the cooking chamber, and if the first of said switches is ineffective the thermally-actuable member cooperates with the second switch to effect deenergization of the heating element at a predetermined peak temperature and if the second of said switches is ineffective the thermally-actuable member cooperates with the first switch only to intermittently sequentially energize and deenergize the heating element to maintain a predetermined lower substantially constant average value of temperature in the cooking chamber.

4. An appliance as set forth in claim 3 in which the means for rendering the switches effective and ineffective includes manually operable switches in series circuits with the respective first-named switches.

5. In an electric cooking appliance including a cooking chamber and a heating element therefor, means for controlling the energization of the heating element to obtain any one of a plurality of different temperature cycles in the cooking chamber, said means including a single thermally-actuable member movable in response to variations in the temperature in the cooking chamber, a maintained-temperature switch, a peak temperature switch, conductors connecting the switches in parallel with each other and in series with the heating element, and manually actuable switches in series circuits with the respective first named switches whereby if both manually-actuable switches are closed the thermally-actuable member cooperates with the two first-named switches in predetermined sequence to effect deenergization of the heating element at a peak temperature and then to intermittently sequentially energize and deenergize the heating element at substantially a lower maintained temperature and if the manually-actuable switch in series circuit with the maintained temperature switch is open, the thermally-actuable member effects deenergization of the heating element by cooperation with the peak temperature switch and if the manually-actuable switch in series with the peak temperature switch is open the thermally-actuable member cooperates with the maintained-temperature switch to intermittently sequentially energize and deenergize the heating element.

6. In a cooking appliance including a cooking chamber and a heating element therefor, means for controlling the energization of the heating element to obtain a momentary peak temperature and then a lower maintained temperature in the cooking chamber, said means including two pivotally mounted circuit controllers, a bimetal member having one end freely movable in response to variations in chamber temperature and adapted to engage the circuit controllers to actuate the same and electric conductors connecting the circuit controllers in parallel with each other and in series with the heating element, the bimetal member first operatively engaging the two circuit controllers in predetermined sequence to move them to open position to deenergize the heating element at a predetermined peak temperature and to intermittently sequentially move one of said circuit controllers to closed and then to open position to maintain a lower predetermined temperature in the cooking chamber.

7. An appliance as set forth in claim 6 which includes a means for rendering effective and ineffective the respective circuit controllers at the will of an operator.

8. In an electric heating device including a heating chamber and a heating element therefor, means for controlling the energization of the heating element to automatically obtain a momentary peak temperature and then a lower maintained temperature in the heating chamber, said means including a single-cycle circuit-control device and a plural-cycle circuit-control device electrically connected in parallel with each other and selectively controlling the energization of the heating element, and a single thermally-actuable member movable in response to variations in chamber temperature for effecting the successive operation of the several circuit-control devices to thereby effect energization of the heating element until a certain peak temperature is reached in the heating chamber, next deenergize the heating element until a certain lower temperature is reached and thereafter intermittently sequentially energize and deenergize the heating element to maintain an average lower temperature in the heating chamber, said circuit-controlling devices being pivotally mounted mercury switches.

FLOYD S. WHEELER.